United States Patent [19]

Horian

[11] Patent Number: 5,423,933
[45] Date of Patent: Jun. 13, 1995

[54] FABRICATION OF PLASTIC AND WOOD VENEER COMPOSITE

[76] Inventor: Richard C. Horian, 555 Esplanade Ave. #517, Redondo Beach, Calif. 90277

[21] Appl. No.: 333,879

[22] Filed: Nov. 3, 1994

Related U.S. Application Data

[63] Continuation of Ser. No. 64,780, May 19, 1993, abandoned.

[51] Int. Cl.⁶ .................... B32B 21/14; C09J 5/02
[52] U.S. Cl. .................. 156/182; 156/309.6; 156/311; 156/324.4
[58] Field of Search ............ 156/311, 324.4, 182, 156/308.2, 309.6; 428/537.1, 106, 114

[56] References Cited

U.S. PATENT DOCUMENTS

| | | | |
|---|---|---|---|
| 1,864,812 | 6/1932 | Elmendorf | 156/299 |
| 2,686,741 | 8/1954 | Farber | 117/147 |
| 2,867,543 | 1/1959 | Braun | 117/46 |
| 3,159,526 | 12/1964 | Van Hartesveld et al. | 156/311 |
| 3,166,110 | 1/1965 | Hartesveld et al. | 156/311 |
| 3,560,251 | 2/1971 | Hager | 117/102 |
| 3,936,551 | 2/1976 | Elmendorf et al. | 428/106 |
| 4,146,973 | 4/1979 | Steffensen et al. | 34/16 |
| 4,191,368 | 3/1980 | Brookhyser | 271/10 |
| 4,205,107 | 5/1980 | Jaschke et al. | 428/58 |
| 4,250,214 | 2/1981 | Broxterman et al. | 428/514 |
| 4,291,101 | 9/1981 | Tanizaki et al. | 428/514 |
| 4,407,076 | 10/1983 | Estberg | 34/9.5 |
| 4,420,351 | 12/1983 | Luzzi et al. | 156/62.4 |
| 4,430,371 | 2/1984 | Boyes | 428/61 |
| 4,481,262 | 11/1984 | Shida et al. | 428/441 |
| 4,521,495 | 6/1985 | Hahn | 428/537.1 |
| 4,543,284 | 9/1985 | Baum | 428/106 |
| 4,637,954 | 7/1987 | Ohsumi | 428/342 |
| 4,678,715 | 7/1987 | Giebeler et al. | 428/537.1 |
| 4,743,509 | 5/1988 | Kokrhanek | 428/425.1 |
| 4,767,667 | 8/1988 | Schneider et al. | 428/336 |
| 4,883,719 | 11/1989 | Brebner et al. | 428/541 |
| 4,890,656 | 1/1990 | Ohsumi et al. | 144/350 |
| 4,892,605 | 1/1990 | Schneider et al. | 156/272.6 |
| 4,942,084 | 7/1990 | Prince | 428/294 |
| 5,019,199 | 5/1991 | Menke et al. | 156/245 |

OTHER PUBLICATIONS

Encyclopedia of Chemical Technology, 3rd Edition, vol. 14, p. 18, 1981.

Primary Examiner—Michael W. Ball
Assistant Examiner—Richard Crispino
Attorney, Agent, or Firm—Lyon & Lyon

[57] ABSTRACT

The fabrication of a plastic-wood composite wherein a raw wood is prepared by drying and crushing of at least the outer cell layers of the veneer using a heated platen. A plastic sheet with a coating of more easily fluidized material is then combined with the wood through heat and pressure. Cooling then fixes the composite structure to define a plastic covered composite having the appearance of coated wood.

21 Claims, 1 Drawing Sheet

FABRICATION OF PLASTIC AND WOOD VENEER COMPOSITE

This application is a continuation of application Ser. No. 08/064,780, filed May 19, 1993, now abandoned.

BACKGROUND OF THE INVENTION

The field of the present invention is composites of plastic and wood veneer.

Wood has long been used as both structure and decorative surfacing for furniture and other similar uses and has also been adapted for surfacing nonwood objects such as the interior and exterior components of automobiles. Wood veneer sheeting offers significant virtues such as appearance and strength per unit weight. However, wood is subject to deterioration in many environments. Coatings and laminates have been developed for the preservation of wood. However, these materials tend to be porous, to deteriorate over time, to separate from the wood and/or to require frequent attention. These characteristics have proven to be dissatisfactory in a significant number of applications where longevity and maintenance of appearance without repeated treatment are necessary.

Wood is made up of cells. Each cell consists of an outer cell wall defining a cell cavity. Cells contain sap, moisture and even air. The cell walls contain an amorphous polymeric substance, lignin, which, together with cellulose, forms the fiberous cell walls. Lignin also is the binding material between cells. The cells take in and give off moisture depending on the temperature and humidity of the environment. These changes can cause movement within the grain structure which may in turn lead to splitting, cracking, curling, buckling and warpage.

For aesthetic uses, wood is frequently used as a veneer over structural wood or other materials. Veneer is usually sliced to a commercial thickness of between 0.010 inches and 0.060 inches. Even in such thin sheets, it still contains multiple layers of cellulose cell structures bonded together and interspersed with lignin. The thin nature of wood veneers makes them even more susceptible to the effects of the environment if not properly applied, sealed and maintained. It is these cells which act as sponges to retain and release moisture relative to atmospheric and environmental conditions.

To overcome the effects of the environment, coatings have been employed which are intended to seal a wood surface and, in some instances, are partially dispersed into the wood. The coatings typically do not disturb the cells which remain in tact and responsive to environmental change. Coatings are typically unable to provide a complete barrier to moisture as they are seldom wholly impervious to moisture. Joints and cracks also provide opportunities for moisture intrusion. Standard commercial coatings which retain the appearance of the grain include varnish, polyurethane and many other types of liquid coatings. These have limited utility and are best in protected environments. Plastics have also been used to totally encase wood. Such uses have had difficulties in application, retained integrity, cost and/or inconvenient coating thickness.

Laminations are also employed. Laminations employ sheet material bonded to wood surfaces. They are very much limited in their ability to preserve the structure and appearance of wood. The bonding of laminates typically does not influence the adjacent cell structure; and leakage at a joint or a crack can result in deterioration of the wood and delamination.

SUMMARY OF THE INVENTION

The present invention is directed to the fabrication of a composite of plastic sheeting and wood veneer with a boundary layer of polymeric material and lignin penetrating into the surface of the wood. A wood surface is dried and crushed. Sheeting with a polymeric material coating is heated and pressed onto the prepared wood surface to form a composite structure.

In further and separate aspects of the present invention, preparation of the wood veneer includes heating as a means for driving off moisture and as a means for causing migration of lignin. This preparatory step may be combined with the crushing of at least the outermost layers of cells of the wood surface to create a smooth, dry, open cell layer for subsequent receptive accommodation of the plastic.

In yet other separate aspects of the present invention, highly durable plastic sheeting with a compatible polymeric material layer may be applied under heat and pressure to a prepared wood surface so as to displace the polymeric material and the in situ lignin into the wood surface, thus defining a boundary layer forming a transition from wood to plastic. Cooling may be accomplished while maintaining the application pressure so as to assure fixing of the transient materials in place.

In yet further separate aspects of the invention, wood veneer is employed with plastic sheeting applied to both sides thereof. A sandwich structure is formed providing high grain detail with a thin, highly impervious surface.

The embodiments incorporating the invention include veneer with one or both surfaces overlaid with impervious plastic sheet. Where only one side is overlaid, either the coated or the uncoated side may be exposed. More normally, with the coated side exposed, the uncoated side forms a porous surface particularly suited for bonding with other porous materials. The surface also accommodates bonding to plastics and the like. With the coated side down, more compatible plastic to plastic bonding may be accomplished such as in automotive interiors. A rougher surface is exposed for a more wood like texture and appearance. The exposed side may then be treated with conventional coatings, UV cured coatings or left uncoated. With a veneer, the structure supplied by the overlay helps keep both sides from cracking, peeling and the like. Where both sides are overlaid with plastic, full protection is afforded to both sides and the underside accommodate a plastic to plastic bond.

Accordingly, it is an object of the present invention to provide the fabrication of a composite plastic-wood structure. Other and further objects and advantages will appear hereinafter.

DETAILED DESCRIPTION OF THE PREFERRED EMBODIMENTS

Figure 1:
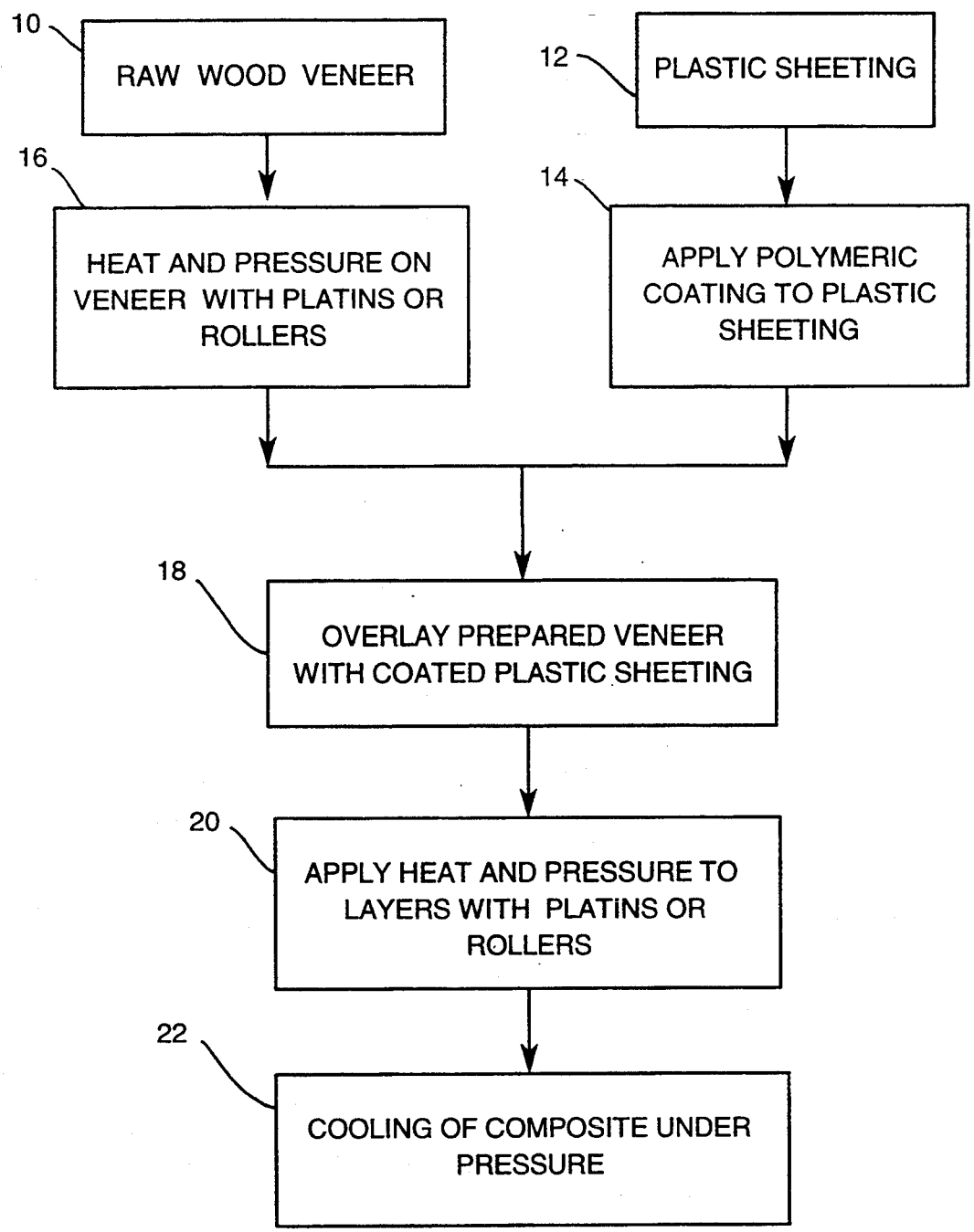
FIG. 1 is a schematic illustrating steps in the fabrication of a composite plastic-wood structure of a preferred embodiment.

A plastic-wood composite may be created by the preparation of a wood surface through heating, drying and crushing of the outer cell layers and a subsequent combining, again under heat, of the prepared wood surface with plastic sheeting coated with a polymeric material. Substantially any wood may be used. The selection of wood will affect the heat, pressure and time required in both the wood preparation and the plastic application.

As aesthetic surfaces are typically achieved using veneers, the present process finds great utility in the application of plastic sheeting to such wood veneers. Wood veneers typically range in thickness from 0.010 inches to 0.060 inches. Veneers are easily heated and lend themselves to convenient manipulation as sheets. Plastic sheeting may be applied to both sides to form a sealed structure protecting the underlying wood from elemental intrusion.

In the treating of the raw wood, substantially all of the moisture is to be removed. This drying process may be accomplished in a variety of ways. Placed in a drying environment, wood will naturally dry out in time. Such a process is not normally feasible from a commercial standpoint. To speed up the process, heat may be applied. It is also possible to accelerate drying using a vacuum. Heating to in excess of 212° causes, at one atmosphere, the substantially full vaporization of water from the wood. Using a veneer, a temperature of around 400° F. with a substantial vacuum reduces the drying time to a matter of seconds. Again, the type of wood selected and the thickness desired impact on the drying process. As a significant advantage of this fabrication is a preservation of the natural wood appearance, heating to the point of charring the wood or the in situ lignin is to be avoided.

Also in preparation, at least the outer layers of cells of the wood are crushed under pressure. Platens or rollers may be employed for this process. With very soft woods, 500 lbs. per sq. inch may be sufficient. With a 0.025 inch veneer of raw walnut, over 1000 lbs/ft$^2$ is preferred. The crushing acts to disturb the cell structure and also provides a smoother surface.

It has been found advantageous to combine the steps of drying and pressing the wood. Heated platens have been used on raw wood veneer to achieve the drying and crushing preparation of the wood. The heated platens act to transfer sufficient heat to the wood so as to convert the in situ water to steam which disperses to atmosphere. The platens also act to crush at least the outer layers of wood cells. The heat and outgassing steam in association with the breakdown of the cell structure is understood to also cause the lignin to disperse more evenly throughout the structure and at the surface of the wood. In doing so, a smooth, relatively shinny surface is created on the wood. To avoid ambient rehydration of the wood, it is quickly passed to the following process, maintained at an elevated temperature or placed in a dry environment following the heating and pressing operation.

The prepared wood is in condition for providing a smooth and porous boundary layer to receive coated plastic sheeting. The plastic sheeting chosen will substantially dictate the surface performance of the resulting composite. Plastic films having known characteristics are available in transparent, smooth sheets. Such film includes polyester, polycarbonate and acrylic sheeting. Other common commercially available polymer and copolymer sheets are equally applicable depending on the application and desired surface characteristics. Inherent characteristics of the plastic sheeting useful for most applications include nonscratching, lack of moisture permeability, clarity and the like.

The plastic sheeting is coated on one side with a second plastic polymer or copolymer that is more easily fluidized than the sheeting. This coating may achieve the ability to flow more easily than the sheeting itself by any of a number of well known characteristics. The material may inherently have this characteristic, may be less polymerized or may be treated. Candidates include ethyl vinyl acetate, methyl methacrylate, acrylic monomers and polyethylene. Rubber compounds, crystalline or noncrystalline wax compositions and chemical additives may also be employed. In the choice of materials, the adhered polymeric material is to be capable of intrusion into the crushed cell boundary layer. The plastic sheeting may be treated with primers, corona treatment, surface roughening and other techniques for good adhesion of the polymeric material to the plastic sheet.

The plastic sheeting is then placed on the wood surface with the coated side against the wood. The combination of prepared wood with the overlaid coated plastic sheeting is then pressurized under a heated condition. Heated platens or rollers may be used. The pressure and temperature is to be such that the coating and the in situ lignin are displaced into and about the crushed cell structure to define a mixed boundary layer of polymeric material, lignin and cellulose structure. The characteristics of the materials used again determine the appropriate temperature and pressure. A temperature of 400° F. and a pressure of 1000 lbs/ft$^2$ have been employed to adequately create the desired structure. Where hot curing is not used, the final structure is fixed in a rigid state by cooling the platens or rollers or directly to the surface of the compressed material.

One preferred example includes the fabrication of a composite veneer comprising a 0.025" thick raw walnut veneer 10, a 0.010" polycarbonate film 12 with a micro polysilicate surface coating and a 0.004" polyester ethyl vinyl acetate copolymer adhesive layer 14 of a type commercially available. The wood was prepared 16 by being compressed between platens at approximately 1000 lbs/ft$^2$ with the platens at 400° F. The compression was maintained until substantial outgassing of steam ceased. The prepared veneer was immediately overlaid 18 with the coated plastic sheeting and again compressed 20 at 1000 lbs/ft$^2$ at 325° F. between platens. The pressure was maintained and the platens were cooled 22° to 200° F. before the composite structure was released.

The foregoing sample was tested according to automotive standards without negative effect. It was tested for water resistance, solvent resistance, mar resistance, abrasion resistance, heat resistance and UV resistance. The heat resistance included a temperature of 88° C. for 168 hours. The UV testing was at 400 kilajules with consecutive environmental cycling of 6 hours at 38° C. and 98% humidity, 2 hours at 35° C., 16 hours at 85° C. and 2 hours at 38° C. with 98% humidity. The sample remained pliable, crack-free, dimensionally stable and cosmetically attractive.

Accordingly, the fabrication of an aesthetic composite veneer having the appearance of coated wood is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A method for fabricating a plastic-wood composite using wood veneer having naturally occurring lignin, comprising the steps of drying the wood veneer to remove substantially all of the moisture therefrom;

pressing the wood vexleer sufficiently to crush at least the outermost layers of cells and to establish a smooth surface;

overlaying the wood veneer with plastic sheeting having a polymeric material on one side thereof adjacent the wood veneer;

heating under pressure the overlaid wood veneer and plastic sheeting to displace the polymeric material into the crushed cells to create a mixed boundary layer of polymeric material and lignin in the crushed cells;

cooling the heated overlaid wood veneer and plastic sheeting.

2. The method of claim 1 wherein said step of drying wood veneer includes heating the wood veneer.

3. The method of claim 2 wherein said steps of drying and pressing the wood veneer are performed simultaneously.

4. The method of claim 2 wherein said step of drying wood veneer further includes subjecting the wood veneer to a vacuum during heating.

5. The method of claim 1 wherein said step of heating the wood veneer is to at least 212 degrees F.

6. The method of claim 1 wherein said steps of drying and pressing the wood veneer are performed simultaneously.

7. The method of claim 1 wherein said steps of drying and pressing the wood veneer are between heated platens.

8. The method of claim 1 wherein said steps of drying and pressing the wood veneer are between heated rollers.

9. The method of claim 1 wherein said step of drying the wood veneer includes heating the wood veneer and is performed simultaneously with said step of pressing the wood veneer to effect a smooth surface to the wood veneer and cause lignin in the wood veneer to be more evenly dispersed throughout the cellular structure of the wood vener.

10. The method of claim 1 wherein said step of overlaying the wood veneer with plastic sheeting follows said steps of drying and pressing the wood veneer.

11. The method of claim 1 wherein said step of overlaying the wood veneer with plastic sheeting includes overlaying plastic sheeting having polymeric material on one side thereof adjacent the wood veneer on both sides thereof.

12. The method of claim 1 wherein said step of heating the overlaid wood veneer is sufficient for flow of lignin in the wood veneer and the flow of polymeric material into the outermost layer of cells.

13. The method of claim 1 wherein said step of heating the overlaid wood veneer is in excess of 312° F.

14. The method of claim 1 wherein said step of heating the overlaid wood veneer and plastic sheeting under pressure is between heated rollers.

15. The method of claim 1 wherein said step of heating the overlaid wood veneer and plastic sheeting under pressure is between heated platens.

16. The method of claim 1 wherein said step of cooling is under pressure.

17. The method of claim 1 wherein said steps of heating and cooling the overlaid wood veneer are performed seriatim with the overlaid wood veneer continuously under pressure.

18. The method of claim 1 wherein the wood veneer is raised to in excess of 212 degrees F in said step of drying and remains above 212 degrees F during each said step until said step of cooling.

19. A method for fabricating a plastic-wood composite using wood veneer having naturally occurring lignin, comprising the steps of drying the wood veneer to remove substantially all of the moisture therefrom;

heating and pressing the wood veneer sufficiently to crush at least the outermost layers of cells, to dry the wood veneer to remove substantially all moisture therefrom to disperse the lignin more evenly throughout the cellular structure of the wood veneer and to effect a smooth surface on the wood veneer;

overlaying the wood veneer with plastic sheeting having a polymeric material on one side of the plastic sheeting adjacent the wood veneer;

sequentially heating and cooling under continuous pressure the overlaid wood veneer and plastic sheeting to displace the polymeric material and lignin into the crushed ceils to create a mixed boundary layer of polymeric material and lignin in the crushed cells and fix the composite together.

20. A method for fabricating a plastic-wood composite using wood veneer having naturally occurring lignin, comprising the steps of pressing the wood veneer sufficiently no crush at least the outermost layers of cells and to establish a smooth surface;

overlaying the wood veneer with plastic sheeting having a polymeric material on one side thereof adjacent the wood veneer;

heating under pressure the overlaid wood veneer and plastic sheeting to displace the polymeric material into the crushed cells to create a mixed boundary layer of polymeric material and lignin in the crushed cells;

cooling the heated overlaid wood veneer and plastic sheeting.

21. A method for fabricating a plastic-wood composite using wood veneer having naturally occurring lignin, comprising the steps of heating and pressing the wood veneer sufficiently to crush at least the outermost layers of cells, to dry the wood veneer to remove substantially all moisture therefrom to disperse the lignin more evenly throughout the cellular structure of the wood veneer and to effect a smooth surface on the wood veneer;

overlaying the wood veneer with plastic sheeting having a polymeric material on one side of the plastic sheeting adjacent the wood veneer;

sequentially heating and cooling under continuous pressure the overlaid wood veneer and plastic sheeting to displace the polymeric material and lignin into the crushed cells to create a mixed boundary layer of polymeric material and lignin in the crushed cells and fix the composite together.

* * * * *

UNITED STATES PATENT AND TRADEMARK OFFICE
CERTIFICATE OF CORRECTION

PATENT NO. : 5,423,933
DATED : June 13, 1995
INVENTOR(S) : RICHARD C. HORIAN

It is certified that error appears in the above-identified patent and that said Letters Patent is hereby corrected as shown below:

In claim 1 (col. 5, l. 6), delete "vexleer" and insert therefor -- veneer --.

In claim 19 (col. 6, l. 29), delete "ceils" and insert therefor -- cells --.

Signed and Sealed this

Tenth Day of October, 1995

Attest:

BRUCE LEHMAN

Attesting Officer     Commissioner of Patents and Trademarks